(No Model.)
W. B. CARPENTER.
Process of Necking Celluloid Tubes.
No. 235,932.　　　　Patented Dec. 28, 1880.
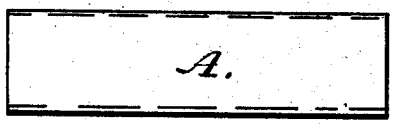
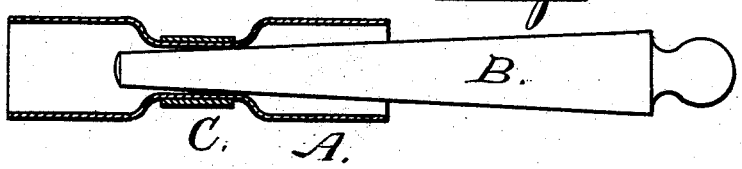
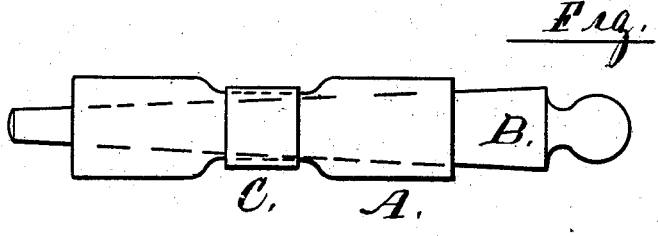
Witnesses　　　　Inventor
　　　　　　　　William B. Carpenter
　　　　　　　　By Horace Harris
　　　　　　　　　　　Atty

UNITED STATES PATENT OFFICE.

WILLIAM B. CARPENTER, OF NEWARK, NEW JERSEY, ASSIGNOR TO HIMSELF AND CELLULOID NOVELTY COMPANY, OF NEW YORK, N. Y.

PROCESS OF NECKING CELLULOID TUBES.

SPECIFICATION forming part of Letters Patent No. 235,932, dated December 28, 1880.

Application filed May 28, 1880. (No model.)

*To all whom it may concern:*

Be it known that I, WILLIAM B. CARPENTER, of Newark, in the county of Essex and State of New Jersey, have invented a new and useful Improvement in the Process of Necking Celluloid Tubes, of which the following is a specification.

My invention relates to a process of necking or contracting celluloid tubes, or tubes of any similar plastic material, at certain points when the material is to be used for dolls, &c., and two dolls are to be molded from one tube, and the center between them needs to be reduced for the neck of a doll; and it consists in the appliances used to prevent the wrinkling or folding over of the tube at the point of contraction, which is common in the hitherto-known methods of doing this work.

Figure 1 shows the side of a tube before a part of it has been reduced. Fig. 2 is a sectional view of a tube having the neck. Fig. 3 is a side view, showing the necking process partly completed.

The tubes represented by Fig. 1 are of any diameter or length required for the goods to be manufactured.

The tube is softened by heating, usually by plunging it into hot water, when a taper mandrel, B, is put inside of it and an elastic clamp, C, is put about it, which tends to contract the tube. The mandrel nearly fills the tube where the clamp encircles it, and this prevents the wrinkling of the celluloid under the strong pressure of the clamp. As the material contracts under the clamp the mandrel is gradually drawn out, bringing a smaller part under the clamp, allowing of the further contraction required without wrinkling. This is of great importance, as a wrinkle once made cannot be worked out, and the goods are spoiled.

This clamp may be of elastic rubber or an elastic metal coil having a center pressure, and the effect be the same.

What I claim as my invention, and desire to secure by Letters Patent, is—

In necking tubes of celluloid or similar plastic material, the elastic clamp C, in combination with the taper mandrel B, substantially as and for the purpose specified.

WILLIAM B. CARPENTER.

Witnesses:
HORACE HARRIS,
JOSEPH A. ENO.